US012637627B2

(12) United States Patent
Ugono et al.

(10) Patent No.: US 12,637,627 B2
(45) Date of Patent: May 26, 2026

(54) FORMULATIONS AND METHODS TO REMOVE NON-ACIDIC SULFUR COMPOUNDS FROM GAS STREAMS

(71) Applicant: Baker Hughes Oilfield Operations LLC, Houston, TX (US)

(72) Inventors: Onome Ugono, Rosenberg, TX (US); Sankaran Murugesan, Katy, TX (US); Sai Reddy Pinappu, Sugar Land, TX (US); Jeffery Bolton, Baton Rouge, LA (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 51 days.

(21) Appl. No.: 18/377,232

(22) Filed: Oct. 5, 2023

(65) Prior Publication Data

US 2025/0115816 A1      Apr. 10, 2025

(51) Int. Cl.
  *C10L 3/10*        (2006.01)
  *B01D 53/14*        (2006.01)
  (Continued)

(52) U.S. Cl.
  CPC .......... *C10L 3/101* (2013.01); *B01D 53/1425* (2013.01); *B01D 53/1487* (2013.01);
  (Continued)

(58) Field of Classification Search
  CPC . C10L 3/101; B01D 53/1425; B01D 53/1487; B01D 53/1493; B01D 53/48; B01D 53/78; B01D 53/96; B01D 2252/20468; B01D 2252/504; B01D 2257/306; B01D 2257/304; B01D 2257/308
(Continued)

(56) References Cited

U.S. PATENT DOCUMENTS 6,358,402 B1 *  3/2002  Schucker .................. C10G 7/08
                                                                    208/330
6,413,488 B1   7/2002  Smith et al.
                  (Continued)

FOREIGN PATENT DOCUMENTS

| CN | 103920380 A | 7/2014 |
| CN | 106833719 A | 6/2017 |
(Continued)

OTHER PUBLICATIONS

Javaldi, Rashad , et al., "Desulfurization of heavy oil", Appl. Petrochem Res., Mar. 2012, 17 pp.
(Continued)

*Primary Examiner* — Prem C Singh
*Assistant Examiner* — Francis C Campanell
(74) *Attorney, Agent, or Firm* — Crowe & Dunlevy, P.C.

(57) ABSTRACT

Non-acidic sulfur compounds can be extracted from a gas stream by contacting the gas stream with a carbonate solvent that contains at least one organic carbonate in an amount that is effective to solvate at least a portion of the non-acidic sulfur compounds. The gas steam can then be separated from the carbonate solvent that contains the non-acidic sulfur compounds. The carbonate solvent may optionally include a co-solvent and/or a mercaptan scavenger.

18 Claims, 6 Drawing Sheets

(51) Int. Cl.
  *B01D 53/48*   (2006.01)
  *B01D 53/78*   (2006.01)
  *B01D 53/96*   (2006.01)

(52) U.S. Cl.
  CPC ......... *B01D 53/1493* (2013.01); *B01D 53/48*
    (2013.01); *B01D 53/78* (2013.01); *B01D*
   *53/96* (2013.01); *B01D 2252/20468* (2013.01);
   *B01D 2252/504* (2013.01); *B01D 2257/306*
              (2013.01)

(58) Field of Classification Search
  USPC ......................................................... 585/862
  See application file for complete search history.

(56)      References Cited

U.S. PATENT DOCUMENTS

| | | | |
|---|---|---|---|
| 8,298,320 | B2 | 10/2012 | Cozean |
| 8,807,214 | B2 | 8/2014 | Khan et al. |
| 9,463,989 | B2 | 10/2016 | Menendez et al. |
| 9,856,423 | B2 | 1/2018 | Hao et al. |
| 9,914,885 | B2 | 3/2018 | Choi et al. |
| 10,093,868 | B1 | 10/2018 | Weers et al. |
| 10,414,989 | B2 | 9/2019 | Weers et al. |
| 10,570,344 | B2 | 2/2020 | Weers et al. |
| 10,604,539 | B2 | 3/2020 | Boday et al. |
| 10,633,601 | B2 | 4/2020 | Weers |
| 10,822,549 | B2 | 11/2020 | Biggerstaff et al. |
| 11,053,447 | B2 | 7/2021 | Weers et al. |
| 2009/0107890 | A1 | 4/2009 | Hamad et al. |
| 2011/0000823 | A1 | 1/2011 | Hamad et al. |
| 2014/0262740 | A1 | 9/2014 | Mccaulley |
| 2017/0335204 | A1* | 11/2017 | Ekoue-Kovi .......... C10G 29/20 |
| 2019/0144761 | A1* | 5/2019 | Weers ....................... C07C 7/20 |
| | | | 208/240 |
| 2024/0132787 | A1* | 4/2024 | Murugesan ........... C10G 21/20 |

FOREIGN PATENT DOCUMENTS

| | | |
|---|---|---|
| CN | 108003934 A | 5/2018 |
| WO | 0159033 A1 | 8/2001 |
| WO | 2007103440 A2 | 9/2007 |

OTHER PUBLICATIONS

Kobotaeva, Natalia, et al., "Extractants Based on Coordinating Liquid Polar Solvents for Removal of Sulfur Compounds from Diesel Fuels", Appl. Sci, Jun. 2018, 8pp.

\* cited by examiner

N₂ In

N₂ Out 200    202    204    206    208

200    202    204    206    208

1

FORMULATIONS AND METHODS TO REMOVE NON-ACIDIC SULFUR COMPOUNDS FROM GAS STREAMS

FIELD OF THE INVENTION

This invention generally relates to desulfurization of gas streams and, more particularly, but not by way of limitation, to formulations and methods for the removal of non-acidic sulfur compounds from gas streams.

BACKGROUND OF THE INVENTION

Municipal waste landfills and waste facilities used by the paper and pulp industry often contain high levels of organic waste. Anaerobic digestion of this organic matter produces methane, while decomposition processes generate sulfur compounds, such as hydrogen sulfide ($H_2S$), methanethiol, dimethyl sulfide, and other volatile compounds that contaminate the gas stream. These compounds cause an odor nuisance, due to their very low odor threshold value. Certain environmental regulations mandate that these sulfur-based contaminants be removed from the gas streams to avoid penalties and shut down.

Various desulfurization processes are used to remove sulfur compounds from gas streams, including physical-chemical techniques (such as scrubbing, adsorption, incineration, and masking) and biological-based technologies (such as biofilters, biotrickling filters, bioscrubbers, and membrane bioreactors). The listed methods effectively remove sulfur compounds that are acidic and reactive in nature, such as $H_2S$ and mercaptans. Non-acidic, non-reactive sulfur compounds, on the other hand, are challenging to remove through these known desulfurization processes.

Waste-producing industries are also under increased pressure to implement environmentally friendly processes for sulfur removal. Although existing biological-based desulfurization processes are environmentally friendly and cost-effective, these technologies rely on time-consuming processes that are slow to address sulfur contamination. Thus, these industries lack an environmentally friendly option for sulfur removal that is time-efficient, as well as effective.

It is therefore desirable to develop effective and efficient processes for desulfurization of gas streams and, in particular, the removal of non-acidic sulfur compounds from gas streams.

SUMMARY OF THE INVENTION

There is provided, in one aspect, a carbonate solvent for removing non-acidic sulfur compounds from a gas stream. The carbonate solvent includes at least one organic carbonate and a co-solvent. The co-solvent is caprolactam, valerolactam, azetidinone, aza-2-cyclooctanone, aminododecanolactam, or a combination thereof.

In another aspect, a method is disclosed for extracting non-acidic sulfur compounds from a gas stream. The method includes the steps of obtaining a carbonate solvent that has at least one organic carbonate, contacting the gas stream with an amount of the carbonate solvent that is effective to solvate at least a portion of the non-acidic sulfur compounds from the gas stream, and separating the gas stream from the carbonate solvent that contains the non-acidic sulfur compounds.

In yet another aspect, a method for extracting non-acidic sulfur compounds from a gas stream involves the steps of obtaining a carbonate solvent, bubbling the gas stream through an amount of the carbonate solvent that is effective to solvate at least a portion of the non-acidic sulfur compounds from the gas stream, and separating the gas stream from the carbonate solvent that contains the non-acidic sulfur compounds. The carbonate solvent includes at least one organic carbonate, and the non-acidic sulfur compounds include dimethyl sulfide.

DETAILED DESCRIPTION

Figure 1:
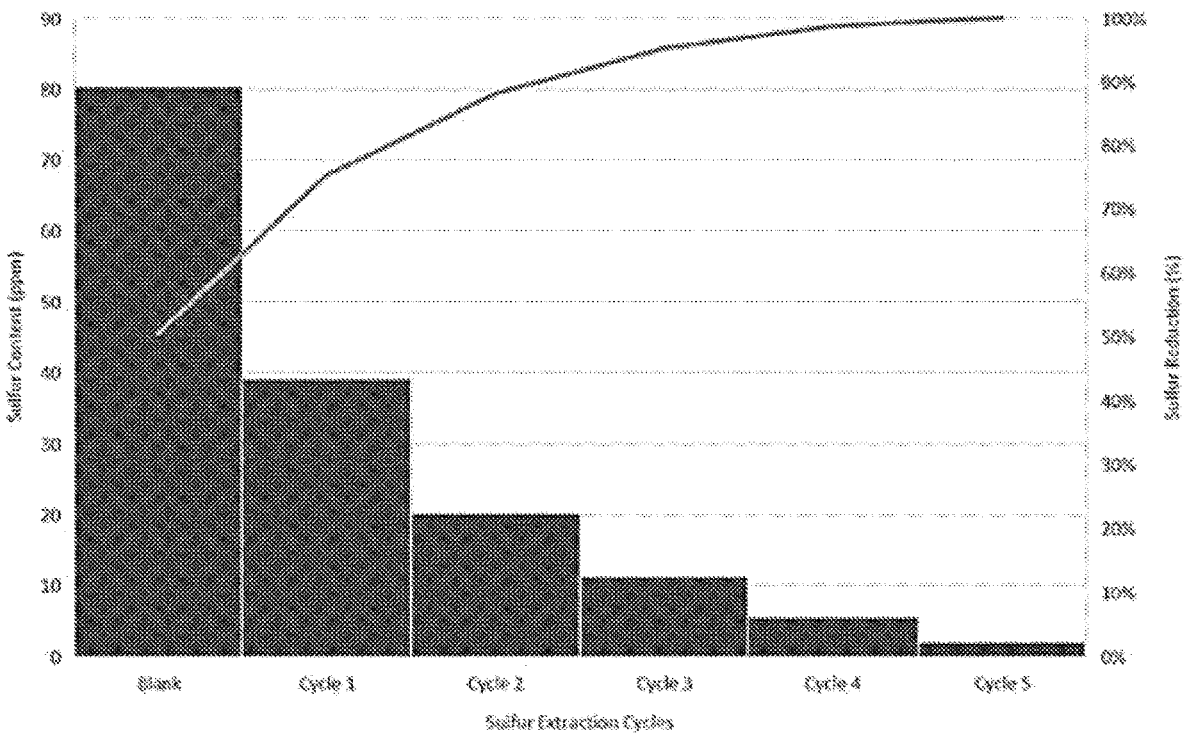
FIG. 1 is a line graph superimposed over a bar chart that illustrates sulfur reduction resulting from a treatment with one embodiment of a carbonate solvent.

It has been discovered that certain carbonate-based formulations are effective at reducing the level of non-acidic sulfur compounds in a gas stream. Said non-acidic sulfur compounds include thiols, sulfides, disulfides, sulfoxides, thiolanes, thiophenes, benzothiophenes, dibenzothiophenes, and benzonaphtothiophenes. In a non-limiting exemplary embodiment, the non-acidic sulfur compounds that are removed from the gas stream include dimethyl sulfide. In another embodiment, the non-acidic sulfur compounds include dimethyl disulfide. In yet another embodiment, the non-acidic sulfur compounds include dimethyl sulfoxide.

In one aspect, a carbonate solvent is used to remove sulfur-based compounds from a gas stream, where the carbonate solvent includes at least one organic carbonate. In various embodiments, the organic carbonate is an organic cyclic alkyl carbonate (i.e., a carbonate ester). Suitable organic carbonates include, but are not necessarily limited to, ethylene carbonate, propylene carbonate, glycerol carbonate, dimethyl carbonate, diethyl carbonate, styrene carbonate, and combinations thereof. It will be appreciated that the organic carbonates are in liquid form under the expected treatment conditions with the carbonate solvent.

In general, the organic carbonate does not chemically react with the non-acidic sulfur compounds to extract them from the gas stream. Rather, the organic carbonate readily solvates the non-acidic sulfur compounds, such that the non-acidic sulfur compounds can be extracted along with the carbonate solvent. The organic carbonate acts as a solvent, and the solvation energy provided by the organic carbonate allows the non-acidic sulfur compounds to be dissolved and/or absorbed in the carbonate solvent. While it is appreciated that the organic carbonate may also remove acidic sulfur compounds (e.g., hydrogen sulfide ($H_2S$) and mercaptans), it is considered more likely that these acidic sulfur compounds react with the organic carbonate, rather than the organic carbonate solubilizing the acidic sulfur compounds. Further, the organic carbonate is able to solvate and extract non-acidic sulfur compounds that are not extracted by traditional treatment methods, where those traditional methods are otherwise able to extract acidic sulfur compounds.

In various embodiments, the carbonate solvent is formulated with a co-solvent. Examples of suitable co-solvents include caprolactam, valerolactam, azetidinone, aza-2-cyclooctanone, aminododecanolactam, and combinations thereof. The volume ratio of organic carbonate to co-solvent in the carbonate solvent ranges from about 95:5 to about 40:60. In some embodiments, the volume ratio is from about 60:40 to about 40:60 (organic carbonate:co-solvent).

In several embodiments, the carbonate solvent includes one or more heterocyclic amines serving as a mercaptan scavenger. Non-limiting examples of suitable heterocyclic amines include oxazolidines, pyrrolidones (e.g., N-methyl-2-pyrrolidone), imidazolines, imidazole, glyoxals, triazines, and quaternary amines. The amount of mercaptan scavenger in the carbonate solvent ranges from about 1 wt. % to about 75 wt. % in one embodiment. In another embodiment, the amount of mercaptan scavenger ranges from about 25 wt. % to about 50 wt. %.

In another aspect, a method is disclosed for extracting non-acidic sulfur compounds from a gas stream. The method includes the steps of obtaining a carbonate solvent, contacting the gas stream with an amount of the carbonate solvent that is effective to solvate at least a portion of the non-acidic sulfur compounds from the gas stream, and separating the gas stream from the carbonate solvent that contains the non-acidic sulfur compounds.

Suitable gas streams for treatment with the carbonate solvent include natural gas, syngas, gases with a high concentration of methane, gases with a high concentration of $CO_2$, propane, liquefied propane gas and flue gas. In various embodiments, the gas stream includes one or more of the following non-acidic sulfur compounds: thiols, sulfides, disulfides, sulfoxides, thiolanes, thiophenes, benzothiophenes, dibenzothiophenes, and benzonaphthothiophenes. In one embodiment, the non-acidic sulfur compounds in the gas stream include dimethyl sulfide. Before the step of contacting the gas stream with the carbonate solvent, the concentration of the non-acidic sulfur compounds ranges from about 1 ppm to about 10,000 ppm. In some pre-treatment streams, the concentration of the non-acidic sulfur compounds in the gas stream prior to treatment with the carbonate solvent is between 20 ppm and about 150 ppm. In other pre-treatment streams, the non-acidic sulfur compounds were present in a concentration of about 100 ppm in the gas stream prior to treatment with the carbonate solvent. In exemplary embodiments, the concentration of non-acidic sulfur compounds in the gas stream after treatment is lowered to between about 0.1 ppm and about 100 ppm. In one non-limiting embodiment, the gas stream contains between about 1 ppm and about 3 ppm non-acidic sulfur compounds after treatment. In another non-limiting embodiment, the post-treatment concentration is between about 1 ppm and about 2 ppm non-acidic sulfur compounds in the gas stream. In one non-limiting embodiment, the starting concentration of the non-acidic sulfur compounds in the gas stream is about 100 ppm and the post-treatment concentration is less than 13 ppm.

In various embodiments, the step of contacting the gas stream with the carbonate solvent involves introducing either the gas stream to the carbonate solvent or the carbonate solvent to the gas stream. In some embodiments, the gas stream is bubbled through a solution of the carbonate solvent, e.g., in a contact tower. For gas treating applications, where the gas stream that contains non-acidic sulfur compounds is bubbled through the carbonate solvent, there will be a large volume of the organic carbonate present relative to the volume of non-acidic sulfur compounds. While the carbonate solvent fills the contact tower, only a small amount of non-acidic sulfur compounds is present at any given point as the gas stream bubbles migrate through the carbonate solvent. In one embodiment, the volume percentage of organic carbonate in the contact tower ranges from about 1 vol. % to about 95 vol. %. In another embodiment, the organic carbonate is present in a range from about 10 vol. % to about 50 vol. %.

As the carbonate solvent absorbs the non-acidic sulfur compounds over time, it is eventually depleted or spent and must, therefore, be periodically replaced. Due to the large amount of carbonate solvent used for the extraction process, regenerating the carbonate solvent for reuse makes the process more cost-effective. In various embodiments, the spent carbonate solvent is regenerated by removing the non-acidic sulfur compounds. In one embodiment, a solid activated medium is used to regenerate the carbonate solvent by absorbing sulfur compounds from the spent carbonate solvent. Suitable solid activated media include activated carbon and silica gel. In another embodiment, distillation is used to preferentially remove the sulfur compounds from the carbonate solvent. In yet another embodiment, electrolysis is used to regenerate the carbonate solvent.

Solubility of the non-acidic sulfur compounds in the carbonate solvent is spontaneous at room temperature (about 20° C.). It will be appreciated, however, that the organic carbonate can be used to solubilize the non-acidic sulfur compounds at temperatures higher than or lower than room temperature. A suitable temperature range does not include temperatures that are hot enough to flash off lighter components of the carbonate solvent, leaving only solid organic carbonate behind. The temperature range also does not include temperatures that are cold enough to freeze the carbonate solvent. In general, it is expected that relatively hotter temperatures will perform better than relatively colder temperatures because the kinetics improve as temperature increases. In various non-limiting embodiments, the gas stream is contacted with the carbonate solvent at a temperature between –10° C. and 60° C.

The following examples are provided to illustrate exemplary embodiments of the carbonate solvent and methods of use. The examples are not intended to limit the scope of the disclosed carbonate solvent or methods, and they should not be so interpreted.

Example I

In this example, the activity of a caustic desulfurization treatment was compared against that of one embodiment of the carbonate solvent. Both the caustic and the carbonate solvent were tested for their ability to remove dimethyl sulfide and thiophene from a natural gas stream with pentane.

The carbonate solvent included about 97.75 wt. % propylene carbonate as the organic carbonate and about 0.75 wt. % glycol as a solvent to prevent solids precipitation. About 1.5 wt. % choline chloride was also present from the manufacturing process for the propylene carbonate, where choline chloride was used as the catalyst. FIG. 1 depicts a line graph superimposed on a bar graph, where the bar graph depicts sulfur content (ppm) in the sample at the end of each sulfur extraction cycle using the carbonate solvent, while the line graph represents the percentage of overall sulfur reduction at the end of each cycle. The bar graph indicates that the sulfur content in the natural gas stream was roughly halved with each cycle as dimethyl sulfide and thiophene were removed. Each cycle represents one round of treatment with a fresh amount of the carbonate solvent.

Figure 2:
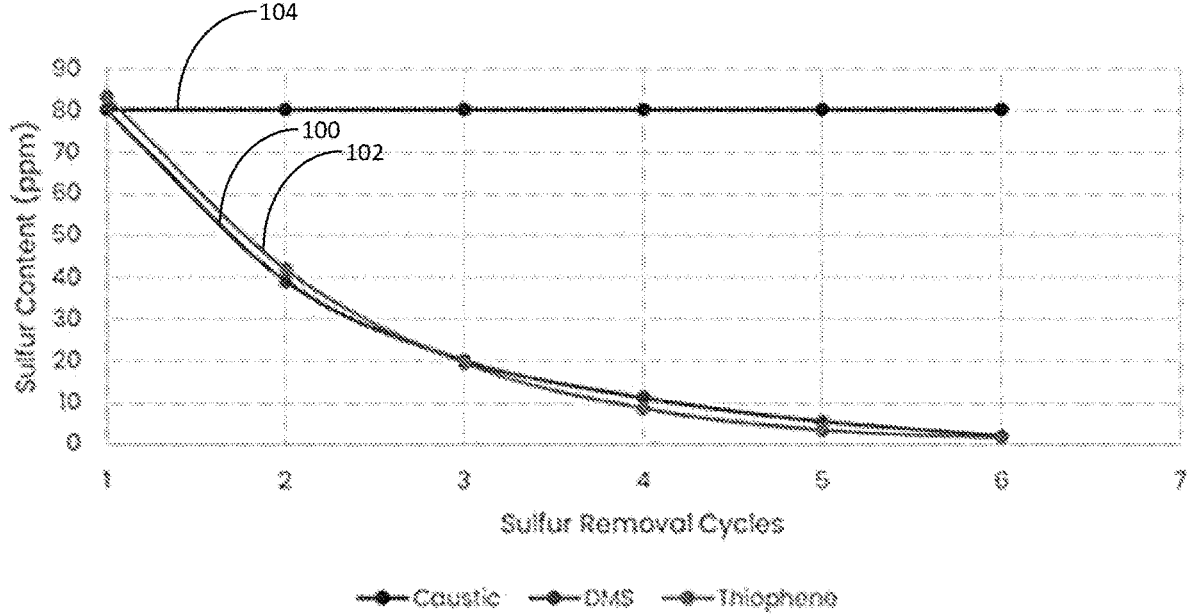
FIG. 2 is a line graph comparing sulfur content after treatment a caustic treatment with sulfur content after treatment with the carbonate solvent of FIG. 1.

Turning to FIG. 2, lines 100 and 102 demonstrate, respectively, the reduction in concentration of dimethyl sulfide ("DMS") and thiophene in the natural gas stream by the carbonate solvent of FIG. 1. In contrast, line 104 depicts treatment of the natural gas stream with only caustic. Despite repeated treatment cycles, the caustic was unable to remove dimethyl and thiophene to reduce the sulfur content from 80 ppm.

Example II

Figure 3:
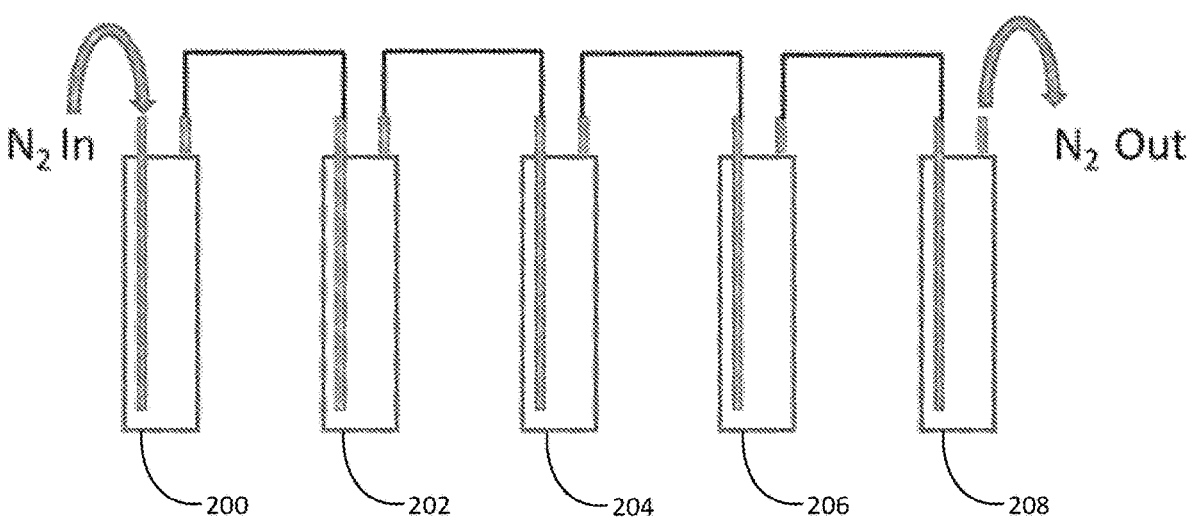
FIG. 3 is a block diagram representing an experiment to demonstrate non-acidic sulfur compound extraction by one embodiment of the carbonate solvent.
Figure 4:
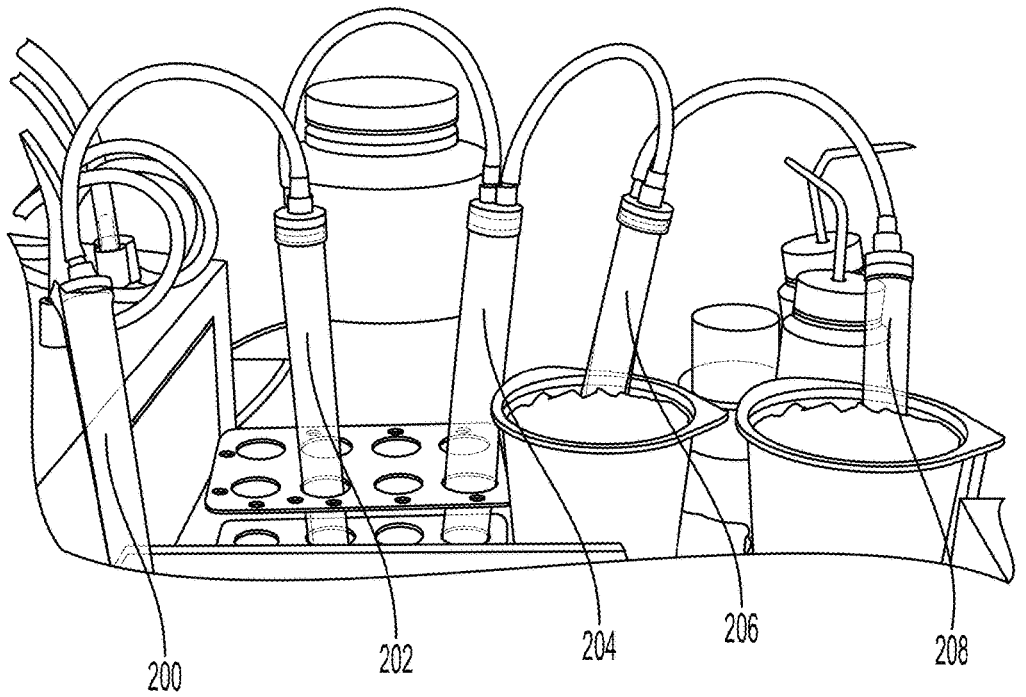
FIG. 4 is photograph of the experimental set-up of FIG. 3.

FIG. 3 depicts a block diagram for an experimental set up to demonstrate the ability of an embodiment of the carbonate solvent having propylene carbonate ("PC") to remove dimethyl sulfide ("DMS") from a hydrocarbon gas stream. FIG. 4 depicts a photograph of the same gas-liquid extraction set up.

At a first tube 200, nitrogen gas was bubbled through a liquid pentane solution having 90.22 ppm of sulfur, which helped to liberate the pentane as a gas stream. The gas stream with the attendant sulfur contaminant was passed through an empty tube 202 and subsequently bubbled through the carbonate solvent in a third tube 204. Passing the gas stream through the empty tube 202 before the third tube 204 ensured that the gas stream did not condense prior to contact with the carbonate solvent. In different rounds of the experiment, between about 15 mL to about 35 mL of the carbonate solvent was used in the third tube 204 to vary the pentane:PC ratio. Dimethyl sulfide from the gas stream was solvated by the propylene carbonate and remained in the third tube 204 while the gas stream was passed into a fourth tube 206 and a fifth tube 208 in series. The fourth and fifth tubes 206, 208 were maintained at 0° C. on ice, causing the pentane to drop out of the gas stream for collection. As a result, only nitrogen gas exited the system from the fifth tube 208. The amount of the collected pentane, the amount of sulfur in the collected pentane, and the amount of sulfur in the propylene carbonate were measured, and a materials balance was ascertained for the sulfur.

Figure 5:
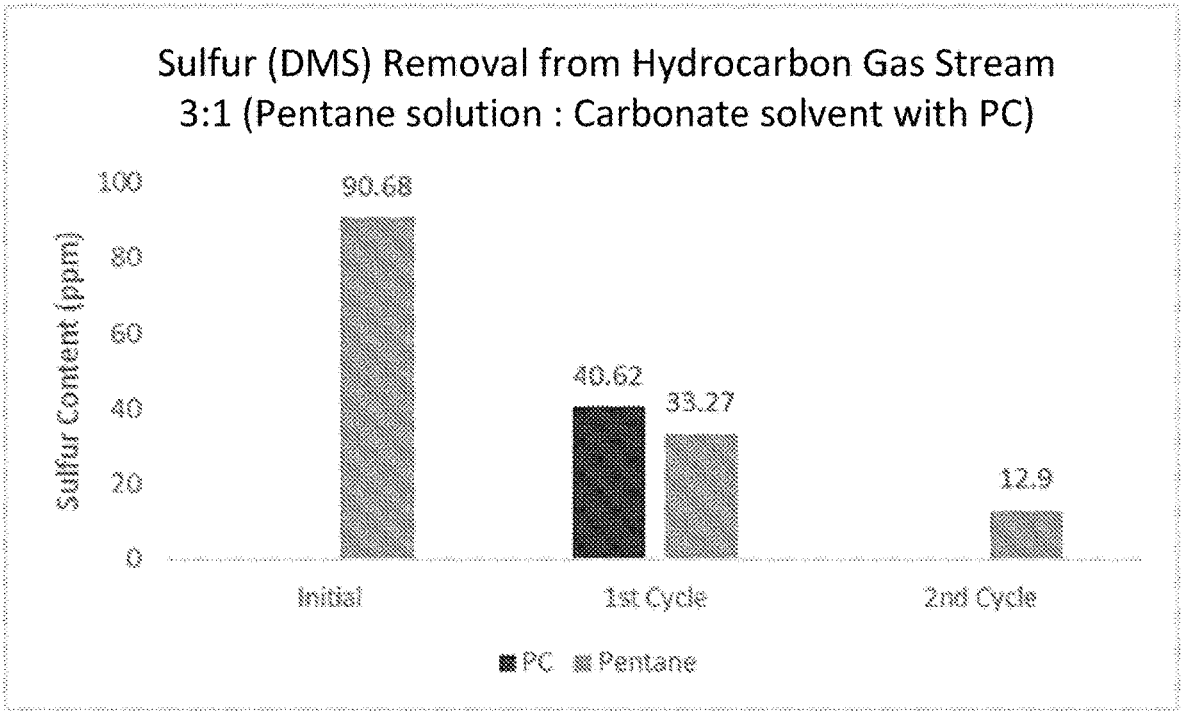
FIG. 5 is a bar chart demonstrating the sulfur content of the carbonate solvent versus the gas stream in one round of the experiment of FIG. 3.

FIG. 5 depicts the initial sulfur content in the carbonate solvent versus in the collected pentane, where the ratio of pentane solution to carbonate solvent was 3:1. After one sulfur reduction cycle with the propylene carbonate, the sulfur content increased in the carbonate solvent (to 40.62 ppm sulfur), while a decrease was observed in the collected pentane (from 90.68 ppm to 33.27 ppm sulfur). For a second cycle, the gas stream was not contacted with propylene carbonate, but a reduction in sulfur content (to 12.9 ppm) was still observed, supporting that at least a portion of the observed sulfur reduction for pentane in the first cycle was not attributable to the propylene carbonate.

Figure 6:
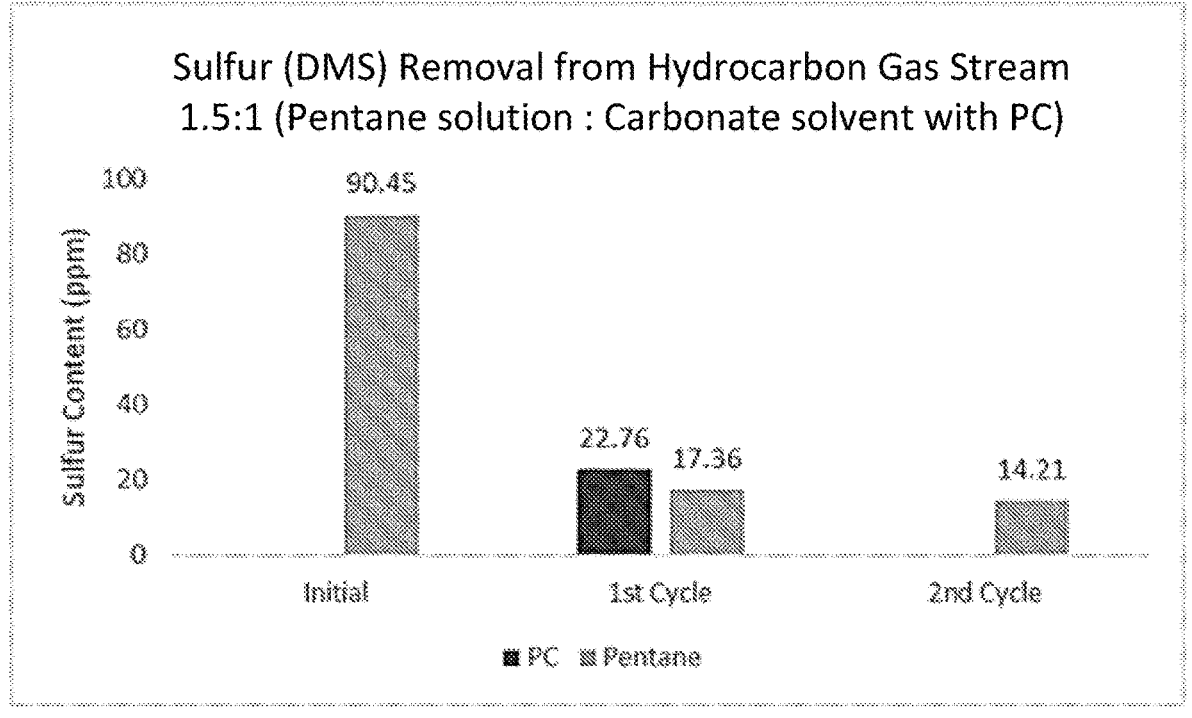
FIG. 6 is a bar chart demonstrating the sulfur content of the carbonate solvent versus the gas stream in another round of the experiment of FIG. 3.

FIG. 6 depicts sulfur removal where the ratio of pentane solution to carbonate solvent was 1.5:1. Although the pentane solution experienced a significant reduction in sulfur content (from 90.45 ppm to 17.36 ppm), only 22.76 ppm of the sulfur was accounted for in the propylene carbonate. After a second cycle, where the gas stream was not contacted with the propylene carbonate, the sulfur content in the pentane was further reduced to 14.21 ppm.

In summary, this example demonstrates the ability of propylene carbonate to extract sulfur from the gas stream by retaining a meaningful percentage of the dimethyl sulfide.

Example III

This example explored regeneration of sulfur-laden propylene carbonate using various solid activated media. The initial screen protocol involved subjecting two stock solutions of propylene carbonate (laden with, respectively, thiophene and a combination of dimethyl sulfide and dimethyl disulfide ("DMS/DMDS")) through the solid activated media and analyzing the sulfur content of the eluent. In each instance, 25 mL of contaminated propylene carbonate was treated with 25 g of either activated carbon or silica gel. As shown in Table 1, the activated carbon outperformed the silica gel in removing the non-reactive sulfur compounds from the propylene carbonate.

TABLE I

| Sample | % sulfur reduction for PC laden with thiophene | % sulfur reduction for PC laden with DMS/DMDS |
|---|---|---|
| Activated Carbon (100 Mesh) | 86 | 59 |
| Activated Carbon (40 Mesh) | 96 | 86 |
| Silica Gel (Grade 12) | 14 | 27 |

Figure 7:
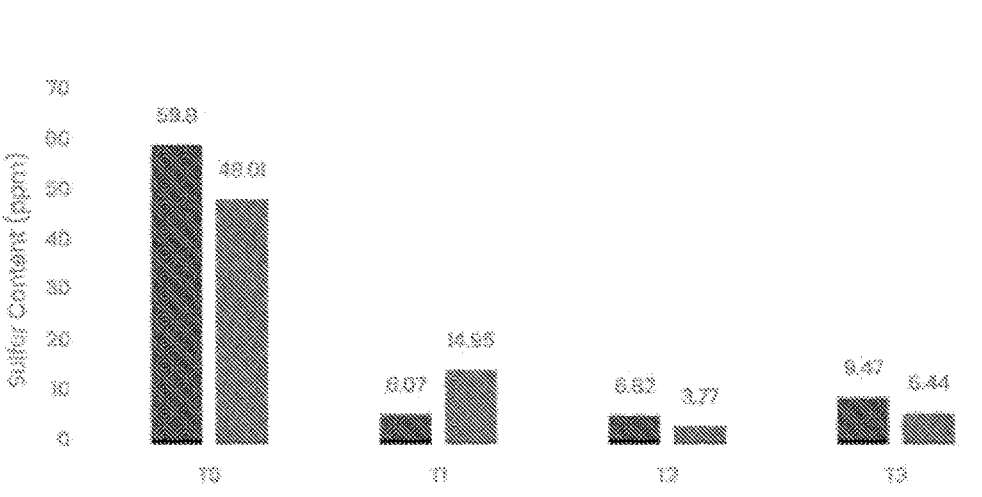
FIG. 7 is a bar chart depicting the sulfur content of regenerated carbonate solvent after passing through an activated carbon mesh.

It was also observed that increasing the surface area of the activated carbon improved the removal of sulfur from the propylene carbonate. Following this observation, the extractive capacity of the high surface area activated carbon was probed. In each experimental set up, the same activated carbon medium was used to treat three separate "batches" of contaminated propylene carbonate. The experiment mimicked cycling propylene carbonate through the chosen filtration medium three times. It was anticipated that the extractive capacity of the activated carbon would be slightly reduced after each pass as sulfur accumulated on the mesh. In general, a steady increase in sulfur content was observed in the propylene carbonate from one cycle to the next, as shown in FIG. 7. This increase was observed even in the sample of thiophene-laden propylene carbonate. In the bar chart of FIG. 7, T0 represents the initial sulfur concentration for the contaminated propylene carbonate, T1 represents the first pass with a batch of contaminated propylene carbonate, T2 represents the second pass with a new batch of contaminated propylene carbonate, and T3 represents the third pass with yet another batch of contaminated propylene carbonate. Although there was a high sulfur reading for the first filtration product (T1), the products from the second cycle (T2) and the third cycle (T3) featured sulfur values that were consistent with the expected trends, where the activated carbon's ability to absorb the non-acidic sulfur materials was diminished slightly with each pass and, therefore, a higher sulfur content remained in the propylene carbonate. The high initial reading was, therefore, likely a result of solvent break-through due to a defect in the laid bed of the media.

In the foregoing specification, the invention has been described with reference to specific embodiments thereof, and has been demonstrated as effective in providing configurations, methods, and compositions for removing non-acidic sulfur compounds from gas streams. However, it will be evident that various modifications and changes can be made thereto without departing from the broader scope of the invention as set forth in the appended claims. Accordingly, the specification is to be regarded in an illustrative rather than a restrictive sense. For example, the type of gas streams, the types, amounts and ratios of organic carbonates, optional components such as co-solvents, soluble metal salts, and/or mercaptan scavengers, treatment procedures, extraction parameters, and other components and/or conditions falling within the claimed parameters, but not specifically identified or tried in a particular method, are expected to be within the scope of this invention. Further, it is expected that the method may change somewhat from one application to another and still accomplish the stated purposes and goals of the methods described herein.

It is claimed:

1. A carbonate solvent for removing non-acidic sulfur compounds from a gas stream, the carbonate solvent comprising:

at least one organic carbonate;

a mercaptan scavenger, wherein the mercaptan scavenger is an oxazolidine; and a co-solvent selected from the group consisting of caprolactam, valerolactam, azetidinone, aza-2-cyclooctanone, aminododecanolactam, and combinations thereof.

2. The carbonate solvent of claim 1, wherein the organic carbonate is selected from the group consisting of ethylene carbonate, propylene carbonate, glycerol carbonate, dimethyl carbonate, diethyl carbonate, styrene carbonate, and combinations thereof.

3. The carbonate solvent of claim 1, wherein the organic carbonate comprises propylene carbonate.

4. A method for extracting non-acidic sulfur compounds from a gas stream, the method comprising the steps of:

obtaining a carbonate solvent, where the carbonate solvent comprises at least one organic carbonate;

contacting the gas stream with an amount of the carbonate solvent that is effective to solvate at least a portion of the non-acidic sulfur compounds from the gas stream;

separating the gas stream from the carbonate solvent containing the non-acidic sulfur compounds;

removing the at least a portion of the non-acidic sulfur compounds from the carbonate solvent to obtain a regenerated carbonate solvent; and treating a subsequent volume of gas stream having non-acidic sulfur compounds with the regenerated carbonate solvent.

5. The method of claim 4, wherein the at least one organic carbonate is selected from the group consisting of ethylene carbonate, propylene carbonate, glycerol carbonate, dimethyl carbonate, diethyl carbonate, styrene carbonate, and combinations thereof.

6. The method of claim 4, wherein the non-acidic sulfur compounds are selected from the group consisting of thiols, sulfides, disulfides, sulfoxides, thiolanes, thiophenes, benzothiophenes, dibenzothiophenes, benzonaphthothiophenes, and combinations thereof.

7. The method of claim 4, wherein the non-acidic sulfur compounds comprise dimethyl sulfide.

8. The method of claim 4, wherein the non-acidic sulfur compounds are present in a concentration of between about 20 ppm and about 10,000 ppm in the gas stream before the step of contacting the gas stream with the amount of the carbonate solvent.

9. The method of claim 4, wherein the non-acidic sulfur compounds are present in a concentration of about 100 ppm in the gas stream before the step of contacting the gas stream with the amount of the carbonate solvent.

10. The method of claim 4, wherein the step of obtaining the carbonate solvent further comprises the step of mixing the at least one organic carbonate with at least one co-solvent selected from the group consisting of caprolactam, valerolactam, azetidinone, aza-2-cyclooctanone, aminododecanolactam, and combinations thereof.

11. The method of claim 4, wherein the step of contacting the gas stream further comprises bubbling the gas stream through the carbonate solvent.

12. The method of claim 4, wherein the step of contacting the gas stream further comprises the step of introducing the gas stream to the carbonate solvent in a contact tower.

13. The method of claim 4, wherein the step of contacting the gas stream is performed at a temperature between −10° C. and 60° C.

14. A method for extracting non-acidic sulfur compounds from a gas stream, the method comprising the steps of:

obtaining a carbonate solvent comprising at least one organic carbonate;

bubbling the gas stream through a first amount of the carbonate solvent that is effective to solvate at least a first portion of the non-acidic sulfur compounds from the gas stream, wherein the non-acidic sulfur compounds comprise dimethyl sulfide;

bubbling the gas stream through a second amount of the carbonate solvent that is effective to solvate a second portion of the non-acidic sulfur compounds from the gas stream;

separating the gas stream from the carbonate solvent containing the non-acidic sulfur compounds; and removing the first portion and the second portion of the non-acidic sulfur compounds from the carbonate solvent.

15. The method of claim 14 where the at least one organic carbonate is selected from the group consisting of ethylene carbonate, propylene carbonate, glycerol carbonate, dimethyl carbonate, diethyl carbonate, styrene carbonate, and combinations thereof.

16. The method of claim 4, wherein the step of removing the at least a portion of the non-acidic sulfur compounds from the carbonate solvent to obtain the regenerated carbonate solvent comprises regenerating the carbonate solvent through electrolysis.

17. The method of claim 4, wherein the step of removing the at least a portion of the non-acidic sulfur compounds from the carbonate solvent to obtain the regenerated carbonate solvent comprises filtration of the carbonate solvent through a solid activated media selected from the group consisting of activated carbon and silica gel.

18. The method of claim 14, wherein the gas stream is selected from the group consisting of syngas, propane, liquefied propane gas, and flue gas.

* * * * *